United States Patent Office 3,496,126
Patented Feb. 17, 1970

3,496,126
PROCESS FOR PREPARING ORGANOPOLY-SILOXANE BEADS
Alfred J. Burzynski, Toledo, Ohio, assignor to Owens-Illinois, Inc., a corporation of Ohio
No Drawing. Continuation-in-part of application Ser. No. 262,229, Mar. 1, 1963. This application Oct. 10, 1967, Ser. No. 674,105
Int. Cl. C08g *31/36, 53/02*
U.S. Cl. 260—9        9 Claims

ABSTRACT OF THE DISCLOSURE

This invention pertains to the preparation of substantially spherical organopolysiloxane beads by agitating a compound having the formula $ZSi(OR)_3$ in an aqueous medium at an acid pH and at a temperature ranging from ambient to about 200° C. in the presence of a hydrophilic colloidal dispersant. Z is defined as alkyl radicals of less than six carbon atoms, alkenyl radicals of less than five carbon atoms, and radicals of the formula RO— where R is an alkyl radical of less than six carbon atoms.

RELATED CASES

This case is a continuation-in-part of copending United States patent application Ser. No. 262,229, filed Mar. 1, 1963 now abandoned.

SUMMARY OF THE INVENTION

The present invention relates to a process for preparing organopolysiloxane beads in substantially spherical form. In particularly, this invention relates to a process for preparing organopolysiloxane beads which contain silicon-bonded aliphatic carbon chains of less than six carbon atoms.

Silanols are compounds which contain one or more hydroxyl groups attached to a silicon atom. If attention is limited to molecules which possess only one silicon atom, four broad types of silanols may be distinguished: (1) silanols, of the formula $T_3SiOH$; (2) silanediols, of the formula $T_2Si(OH)_2$; (3) silanetriols, of the formula $TSi(OH)_3$; and (4) silicic acid, $Si(OH)_4$, which may be regarded as an anomalous member of the series. In these formulas T can represent hydrogen atoms or hydrocarbon radicals. These compounds are in general readily converted to the corresponding ether analogs, siloxanes, by a process which may be envisioned as the loss of one molecule of water per two such hydroxyl groups. When more than one silanol grouping is present per molecule, the product is commonly a mixture of polymeric siloxanes, and detailed structural characterization of the product is usually impracticable. The tendency towards siloxane formation is so great that silanols are usually prepared in situ from a hydrolyzable precursor; corresponding to the classes cited above, these precursors can be compounds of the formulas $T_3SiY$, $T_2SiY_2$, $TSiY_3$, and $SiY_4$, wherein T has the meanings hereinbefore assigned, and Y represents a group convertible by hydrolysis to a hydroxyl group, such as alkoxy, acyloxy or halogen.

Aqueous solutions which contain mixtures of the sodium salts of silicic acid and its condensation products, the polyilicic acids, are commonly referred to as "sodium silicate" solutions. A widely used, commercially available sodium silicate solution, for example, contains about 40% $Na_2Si_3O_7$. These salts can be converted to the corresponding silanols by acidification, and they are ordinarily the precursors of choice because of their relatively low cost.

Silica beads have found application as catalysts or catalyst supports in fixed, moving or fluidized bed systems for hydrocarbon conversion processes in the petroleum industry. Consequently, methods have been provided for preparing beads by condensation of silanols. As applied to sodium silicate precursors, the process usually involves preparation of a suspension of acidified aqueous sodium silicate in a water-immiscible medium such as a hydrocarbon; the resultant suspension is maintained until the spheres have hardened, and they are then separated from the medium, sorted, and washed free of undesirable contaminants. The water-immiscible organic media must be removed by repeated washing, usually with organic solvents, or they must be burned off. The cost of removing these reagents from the product beads and the time consumed in their removal represent, of course, an increase in the cost of the bead forming process.

In accordance with this invention, there is provided a new and improved process for rapidly and inexpensively preparing substantially spherical organopolysiloxane beads of relatively uniform, small size.

More particularly, in accordance with this invention, finely-divided, substantially spherical organopolysiloxane beads are prepared by agitating a compound of the formula $ZSi(OR)_3$ in an aqueous media at an acid pH in the presence of a hydrophilic colloidal dispersant, wherein Z represents a member of the group consisting of alkyl radicals which contain less than six carbon atoms, alkenyl radicals which contain less than five carbon atoms, and radicals of the formula RO—, where R represents an alkyl radical which contains less than six carbon atoms.

The organosilanol precursors of the formula $ZSi(OR)_3$ as defined above include methylorthosilicate, ethylorthosilicate, methyltrimethoxysilane, methyltriethoxysilane, ethyltripropoxysilane, ethyltributoxysilane, propyltri(1,1-dimethylethoxy)silane, propyltriethoxysilane, (1-methylethyl)trimethoxysilane, (1-methylethyl)tripropoxysilane, vinyltriethoxysilane, vinyltributoxysilane, allyltrimethoxysilane, and allyltriethoxysilane. Examples of the corresponding organosilanols are silicic acid, methylsilanetriol, ethylsilanetriol, propylsilanetriol, (1-methylethyl)silanetriol, vinylsilanetriol, and allylsilanetriol.

In accordance with one embodiment hereof, there is provided an aqueous media at a pH of about 3 to 6.9 containing a compound of the formula $ZSi(OR)_3$, as defined above, and a hydrophilic colloidal dispersant in a weight ratio of dispersant:water from about .005:1 to about 1:1. The media is stirred and heated at a temperature in the range from room temperature to reflux temperature at the prevailing pressure, usually not above 200° C., to produce organopolysiloxane beads.

As used herein, hydrophilic colloidal dispersant is defined as including any polymerization suspending agent, e.g. those agents which form a suspension of particles rather than a so-called true solution. Typically, the suspended particles have a mean particle size greater than about 1 millimicron.

Hydrophilic colloidal dispersants as used herein are to be distinguished from the so-called emulsifiers or emulsifying agents which typically have a mean diameter of about 50 angstroms.

Typical hydrophilic colloidal dispersants include cellulose derivatives such as carboxymethylcellulose, ethylcellulose, hydroxyethylcellulose, carboxymethyl hydroxyethyl cellulose, ethyldroxyethylcellulose, and methylcellulose; acrylates such as polyacrylic acid salts and polyacrylamide; natural products such as cornstarch, gelatin, dextrins (corn), alginates, casein, animal glue, and natural gums; and miscellaneous products such as polyvinyl alcohol, polyvinyl methyl ether, and polyvinylpyrrolidone.

In one preferred embodiment of this invention, a mixture which comprises a compound of the formula $ZSi(OR)_3$, as defined hereinbefore, an aqueous acid of pH 3 to 6.9, and starch in a weight ratio of starch:water of from .005:1 to .1:1, is stirred and heated at a temperature in the range from room temperature to reflux temperature, usually not above 200° C., at a pressure of about one atmosphere for a time of from about five minutes to about 1 hour, to produce organopolysiloxane beads of relatively uniform, small size.

The organopolysiloxane beads provided by this invention can be used as refractory fillers in plastics, including polyethylene and alkyd resins; as desiccants and adsorbents; and as pigments or pigment carriers in oil or water based paints.

Although the mechanisms by which the process of the present invention results in bead formation is not known, the following explanation is suggested. The acidification of an aqueous solution or suspension of an alkoxysilane ordinarily results in the formation of a relatively large polysiloxane gel, by the types of condensation processes already described. If the reaction mixture is stirred rapidly during gel formation, smaller particles are obtained, but these are irregular in size and shape. The formation of spherical beads requires conditions which promote intramolecular siloxane condensation at the expense of intermolecular reactions, which lead to gels. The formation of small beads of relatively uniform size and shape requires that the reaction conditions also maintain the silanol reactants in discrete particles whose size is such that their surface tension confines them to a spherical shape until internal siloxane cross linkages are formed to reinforce the spherical structure. The ability of a hydrophilic colloidal dispersant to promote bead formation from a silanol solution which would otherwise merely form a gel can be attributed, therefore, to the sequestering influence of the dispersant on the incipient gel particles. As the polysiloxane molecules achieve colloidal dimensions, they are surrounded by the hydrophilic dispersant, which bonds to them by relatively weak forces, perhaps hydrogen bonds between siloxane and dispersant, or mutually to the solvent. The resultant individual reactive particles, having limited recourse to further linear polymerization, subsequently crosslink to give hard spheres.

Although siloxane formation can usually take place at neutrality, it is more convenient to increase the reaction rate by maintaining at least slightly acidic reaction conditions, for example, at least a pH of 6.9. A lower pH limit is usually determined by the nature of the dispersant. Starch, which is the preferred hydrophilic colloidal dispersant of the present invention, is subject to relatively rapid hydrolysis of its glycosidic linkages in aqueous solutions whose pH is below about 3. Besides decreasing the quantity of effective dispersant, this fragmentation results in the presence of monosaccharides and oligosaccharides in the reaction mixture, and these soluble sugars may be incorporated in the product beads, making them less suitable for certain applications. Although heat can often coagulate colloids, the suspensions of the present invention are usually stable to temperatures up to reflux. Stirring or other agitation is necessary, but the rate and degree can vary widely; stirrers which operate at a few hundred to several thousand r.p.m.'s are satisfactory. In general, the size of the product beads will decrease with increased agitation.

Silanetriols in which the organic substiutent is an aromatic radical or an aliphatic radical containing more than three carbon atoms were found to be unsatisfactory. The compounds of the formula $ZSi(OR)_3$, as defined above, can be present in the initial reaction mixture over a wide concentration range. The highest applicable concentration is that in which only the theoretical amount of water is present. This theoretical amount of water is determined by two factors: the water required to hydrolyze the silanol precursor, and the water which results from subsequent siloxane formation. Assuming the limiting case in which all silanol groups are converted to siloxane linkages, the theoretical lower limit of water necessary per mole of silanol precursor is 1.5 S, where S is the molar concentration of the hydrolyzable precursor. The lowest applicable concentration of precursor is that at which a practical amount of product is no longer obtained. This can be arbitrarily set as a solution which is approximately .001 molar in the silanol precursor.

Addition of aqueous base to the reaction mixture after siloxane formation has proceeded for several minutes can increase the rate at which the beads harden. The time gained is not substantial, however.

EXAMPLE 1

(A) In a 300-ml. (milliliters) beaker were placed 150 ml. of distilled water, 3 g. (grams) of water soluble starch, and enough concentrated hydrochloric acid to bring the pH to 3. To the solution thus obtained was added 50 ml. of methyltriethoxysilane, and the mixture was then heated with stirring at reflux, about 80–85° C. A copious evolution of ethanol was noted, and oily droplets formed in the reaction mixture. The resultant suspension was heated with stirring for an additional thirty minutes, and then subjected to filtration. The beads thus obtained were washed repeatedly with water, then with alcohol, and finally with acetone, and were air dried. These beads range from about 1 micron to 2 mm. in diameter. The beads obtained by the cited process were placed in 100 ml. of water and allowed to stand for about two hours. The water was then tested for the presence of starch with iodine. The results were negative, indicating that no starch remained adhered to the beads.

(B) Substitution of 50 ml. of ethyltrimethoxysilane for the methyltriethoxysilane in the porcedure of Example 1A gives organopolysiloxane beads of similar dimensions.

(C) Substitution of 50 ml. of propyltributoxysilane for methyltriethoxysilane in the procedure of Example 1A gives organopolysiloxane beads of similar dimensions.

(D) Substitution of 50 ml. of vinyltri(1-methylethoxy)silane for the methyltriethoxysilane in the procedure of Example 1A gives organopolysiloxane beads of similar dimensions.

(E) Substitution of 25 ml. of methyltriethoxysilane and 25 ml. of propyltrimethoxysilane for methyltriethoxysilane in the procedure of Example 1A gives organopolysiloxane beads of similar dimensions.

EXAMPLE 2

(A) In a 300 ml. beaker were placed 150 ml. of distilled water, 3 g. of water soluble starch, and enough concentrated hydrochloric acid to bring the pH to 6.5. To the solution thus obtained was added 50 ml. of methyltriethoxysilane, and the mixture was then heated with stirring at reflux, about 80–85° C. The resultant suspension was heated with stirring for an additional thirty minutes, and then subjected to filtration. The beads thus obtained were washed repeatedly with water, then with alcohol, and finally wath acetone, and were then aid dried. The organopolysiloxane beads thus obtained were about 1 micron to about 2 mm. in diameter.

(B) Substitution of 15 g. of water soluble starch for the amount cited above in Example 2A and 25 ml. of propyltrimethoxysilane for the methyltriethoxysilane specified gives, by the procedure therein disclosed, organopolysiloxane beads of similar dimensions.

(C) Substitution of 10 g. of water soluble starch for the amount cited in Example 2A and 30 ml. of allyltripropoxysilane for the methyltriethoxysilane specified gives, by the procedure therein disclosed, organopolysiloxane beads of similar dimensions.

(D) Substitution of 5 g. of water soluble starch for the amount cited in Example 2A and 25 ml. of allyltriethoxysilane and 25 ml. of propyltrimethoxysilane for the methyltriethoxysilane specified gives, by the procedure therein disclosed, organopolysiloxane beads of similar dimensions.

EXAMPLE 3

(A) In a 250-ml. beaker were placed 28 ml. of distilled water, 1 g. of water soluble starch, 88 g. of ethylorthosilicate, and 4 drops of 1 M hydrochloric acid; the solution had a pH of about 6. The reaction mixture thus obtained was heated to boiling at about 90° C. over a period of ten minutes, allowed to remain at this temperature for about 30 minutes, and then subjected to filtration. The beads thus obtained were washed repeatedly with water, then with alcohol, and finally with acetone, and were air dried. These beads range from about 1 micron to 2 mm. in diameter.

(B) Substitution of 88 g. of propylorthosilicate for the ethylorthosilicate in the procedure of Example 3A gives siloxane beads of similar dimensions.

Although this invention has been illustrated hereinbefore with respect to starch, it will be obvious to those skilled in the art that other hydrophilic colloidal dispersants as defined hereinbefore are equally operative. Thus it will be apparent to those skilled in the art that modifications can be made in the foregoing disclosure without departing from its spirit or scope, or from the scope of the following claims.

I claim:
1. A process for preparing organopolysiloxane beads which comprises agitating a compound having the formula $ZSi(OR)_3$ in an aqueous media at an acid pH in the presence of a small effective amount of hydrophilic colloidal dispersant, wherein Z is selected from alkyl radicals having less than six carbon atoms, alkenyl radicals of less than five carbon atoms, and radicals of the formula RO—, where R is an alkyl radical of less than six carbon atoms.

2. The process of claim 1 wherein the acid pH of the media ranges from about 3 to about 6.9.

3. The process of claim 2 wherein the molar ratio of $ZSi(OR)_3$:water in the aqueous media ranges from about 1:1.5 to about 1:1000.

4. A process for producing organopolysiloxane beads which comprises agitating an aqueous mixture of (a) a compound of the formula $ZSi(OR)_3$, wherein R is an alkyl having less than six carbon atoms and Z represents a member of the group consisting of alkyl containing less than six carbon atoms, alkenyl containing less than five carbon atoms, and alkoxy containing less than six carbon atoms, (b) water having a pH of from 3 to 6.9 in a molar ratio of $ZSi(OR)_3$:water of from 1:1.5 to 1:1000 and (c) a material capable of functioning as a hydrophilic colloidal dispersant within said pH range, said dispersant being present in a weight ratio of dispersant:water of about .005:1 to about .1:1.

5. A process for producing organopolysiloxane beads which comprises agitating an aqueous mixture of (a) a compound of the formula $ZSi(OR)_3$ wherein R is an alkyl having less than 6 carbon atoms and Z represents a member of the group consisting of alkyl containing less than 6 carbon atoms, alkenyl containing less than 5 carbon atoms, and alkoxy containing less than 6 carbon atoms, (b) water having a pH of from 3 to 6.9 in a molar ratio of $ZSi(OR)_3$:water of from 1:1.5 to 1:1000, and (c) a water-soluble starch, said starch being present in a weight ratio of starch:water of about .005:1 to about .1:1.

6. The process of claim 5 wherein the mixture is agitated at a temperature of about 25° C. to 200° C. for a period of time sufficient for the formation of the beads.

7. The process of claim 5 wherein the molar ratio of $ZSi(OR)_3$:water is from 1:1.5 to 1:100.

8. The process of claim 7 wherein Z is methyl.

9. The process of claim 8 wherein R is methyl.

References Cited

UNITED STATES PATENTS

| | | | |
|---|---|---|---|
| 3,210,208 | 10/1965 | Grass et al. | |
| 3,228,903 | 1/1966 | Dennis | 260—46.5 |
| 3,257,330 | 6/1966 | Burzynski et al. | 260—46.5 |
| 3,354,095 | 11/1967 | Burzynski et al. | 260—46.5 |

DONALD E. CZAJA, Primary Examiner

M. I. MARQUIS, Assistant Examiner

U.S. Cl. X.R.

260—46.5, 29.2, 448.8, 824, 827